United States Patent
Lindström et al.

(10) Patent No.: US 10,618,509 B2
(45) Date of Patent: Apr. 14, 2020

(54) METHOD OF STARTING A VEHICLE WITH POWER BALANCE

(71) Applicant: Scania CV AB, Södertälje (SE)

(72) Inventors: Johan Lindström, Nyköping (SE); Mathias Björkman, Tullinge (SE); Mikael Bergquist, Huddinge (SE); Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/106,815

(22) PCT Filed: Dec. 23, 2014

(86) PCT No.: PCT/SE2014/051568
§ 371 (c)(1),
(2) Date: Jun. 20, 2016

(87) PCT Pub. No.: WO2015/099598
PCT Pub. Date: Jul. 2, 2015

(65) Prior Publication Data
US 2017/0001621 A1    Jan. 5, 2017

(30) Foreign Application Priority Data

Dec. 23, 2013   (SE) ...................... 1351574

(51) Int. Cl.
*B60W 20/00* (2016.01)
*B60K 1/02* (2006.01)
(Continued)

(52) U.S. Cl.
CPC .............. *B60W 20/00* (2013.01); *B60K 1/02* (2013.01); *B60K 6/365* (2013.01); *B60K 6/387* (2013.01);
(Continued)

(58) Field of Classification Search
CPC combination set(s) only.
See application file for complete search history.

(56) References Cited

U.S. PATENT DOCUMENTS

| 5,433,282 A | 7/1995 | Moroto et al. |
| 5,492,189 A | 2/1996 | Kriegler et al. |

(Continued)

FOREIGN PATENT DOCUMENTS

| DE | 19628000 A1 | 1/1997 |
| DE | 19650723 A1 | 6/1997 |

(Continued)

OTHER PUBLICATIONS

Written Opinion of the International Search Authority for PCT/SE14/051568 dated Apr. 30, 2015.

(Continued)

*Primary Examiner* — Adam D Tissot
*Assistant Examiner* — Edward J Pipala
(74) *Attorney, Agent, or Firm* — Moore & Van Allen PLLC; W. Kevin Ransom

(57) ABSTRACT

Disclosed is a method for control a vehicle with a drive system comprising an output shaft of a combustion engine and a planetary gear with a first and a second electrical machine, connected via their rotors to the components of the planetary gear, the vehicle is started by controlling the first electrical machine to achieve a torque thereof, so that the requested torque is transmitted to the planetary gear's output shaft, and controlling the second electrical machine to achieve a torque, so that the desired power to electrical auxiliary aggregates and/or loads in the vehicle, and/or electric energy storage means, if present in the vehicle, for exchange of electric energy with the first and second electrical machine is achieved.

10 Claims, 6 Drawing Sheets

(51) Int. Cl.

| | | |
|---|---|---|
| B60K 6/365 | (2007.10) | |
| B60K 6/387 | (2007.10) | |
| B60K 6/40 | (2007.10) | |
| B60W 10/02 | (2006.01) | |
| B60W 10/06 | (2006.01) | |
| B60W 10/08 | (2006.01) | |
| B60W 30/18 | (2012.01) | |
| B60W 20/20 | (2016.01) | |
| B60K 6/46 | (2007.10) | |
| B60W 10/115 | (2012.01) | |
| B60W 20/40 | (2016.01) | |
| B60W 20/15 | (2016.01) | |
| F16H 3/72 | (2006.01) | |
| F02D 41/06 | (2006.01) | |
| F02D 41/26 | (2006.01) | |
| F02D 41/30 | (2006.01) | |
| B60K 6/44 | (2007.10) | |
| B60W 20/30 | (2016.01) | |
| F02D 41/04 | (2006.01) | |
| B60W 10/12 | (2012.01) | |
| B60W 20/10 | (2016.01) | |
| B60K 6/445 | (2007.10) | |
| B60K 6/48 | (2007.10) | |
| B60K 17/02 | (2006.01) | |
| B60W 30/188 | (2012.01) | |
| B60K 6/547 | (2007.10) | |
| B60W 10/10 | (2012.01) | |

(52) U.S. Cl.
CPC .......... *B60K 6/40* (2013.01); *B60K 6/44* (2013.01); *B60K 6/445* (2013.01); *B60K 6/46* (2013.01); *B60K 6/48* (2013.01); *B60K 17/02* (2013.01); *B60W 10/02* (2013.01); *B60W 10/06* (2013.01); *B60W 10/08* (2013.01); *B60W 10/115* (2013.01); *B60W 10/12* (2013.01); *B60W 20/10* (2013.01); *B60W 20/15* (2016.01); *B60W 20/20* (2013.01); *B60W 20/30* (2013.01); *B60W 20/40* (2013.01); *B60W 30/18* (2013.01); *B60W 30/181* (2013.01); *B60W 30/18027* (2013.01); *B60W 30/1886* (2013.01); *B60W 30/18109* (2013.01); *F02D 41/042* (2013.01); *F02D 41/062* (2013.01); *F02D 41/26* (2013.01); *F02D 41/3005* (2013.01); *F16H 3/728* (2013.01); *B60K 6/547* (2013.01); *B60W 10/10* (2013.01); *B60W 30/18009* (2013.01); *B60W 2400/00* (2013.01); *B60W 2510/125* (2013.01); *B60W 2520/40* (2013.01); *B60W 2710/021* (2013.01); *B60W 2710/06* (2013.01); *B60W 2710/0644* (2013.01); *B60W 2710/081* (2013.01); *B60W 2710/083* (2013.01); *B60W 2710/105* (2013.01); *B60W 2710/1038* (2013.01); *B60W 2710/125* (2013.01); *B60W 2710/248* (2013.01); *B60W 2710/30* (2013.01); *B60W 2710/305* (2013.01); *B60W 2720/40* (2013.01); *B60Y 2200/92* (2013.01); *B60Y 2300/18* (2013.01); *B60Y 2300/188* (2013.01); *B60Y 2300/18025* (2013.01); *B60Y 2300/18091* (2013.01); *B60Y 2300/19* (2013.01); *B60Y 2300/43* (2013.01); *B60Y 2300/60* (2013.01); *B60Y 2300/78* (2013.01); *B60Y 2300/84* (2013.01); *B60Y 2400/73* (2013.01); *Y02T 10/6221* (2013.01); *Y02T 10/6239* (2013.01); *Y02T 10/6286* (2013.01); *Y10S 903/903* (2013.01); *Y10S 903/91* (2013.01); *Y10S 903/93* (2013.01); *Y10S 903/945* (2013.01)

(56) References Cited

U.S. PATENT DOCUMENTS

| | | | |
|---|---|---|---|
| 5,508,574 A | 4/1996 | Vlock | |
| 5,735,770 A | 4/1998 | Omote et al. | |
| 6,018,198 A | 1/2000 | Tsuzuki et al. | |
| 6,083,138 A | 7/2000 | Aoyama et al. | |
| 6,354,974 B1 | 3/2002 | Kozarekar | |
| 6,579,201 B2 | 6/2003 | Bowen | |
| 7,237,634 B2 | 7/2007 | Severinsky et al. | |
| 7,282,008 B2 | 10/2007 | Oshidari | |
| 8,182,391 B2* | 5/2012 | Klemen | B60K 6/365 180/65.265 |
| 8,403,807 B2 | 3/2013 | Tabata et al. | |
| 8,500,589 B2 | 8/2013 | Ortmann et al. | |
| 8,727,925 B2 | 5/2014 | Kaltenbach et al. | |
| 8,840,502 B2* | 9/2014 | Bergquist | B60K 6/387 475/5 |
| 8,905,892 B1* | 12/2014 | Lee | B60K 6/42 475/317 |
| 9,139,076 B2* | 9/2015 | Lee | B60K 6/365 |
| 9,266,418 B2* | 2/2016 | Lee | B60K 6/365 |
| 9,327,716 B2 | 5/2016 | Pettersson et al. | |
| 9,441,708 B2 | 9/2016 | Kimes et al. | |
| 9,463,688 B2 | 10/2016 | Matsubara et al. | |
| 9,527,388 B2 | 12/2016 | Saito et al. | |
| 9,592,821 B2 | 3/2017 | Pettersson et al. | |
| 9,643,481 B2* | 5/2017 | Goleski | B60K 6/547 |
| 9,937,920 B2 | 4/2018 | Lindström et al. | |
| 2005/0049100 A1* | 3/2005 | Ai | B60K 6/365 475/5 |
| 2007/0056784 A1 | 3/2007 | Joe et al. | |
| 2007/0102209 A1 | 5/2007 | Doebereiner | |
| 2007/0149334 A1 | 6/2007 | Holmes et al. | |
| 2008/0009380 A1 | 1/2008 | Iwanaka et al. | |
| 2008/0081734 A1 | 4/2008 | Duffy et al. | |
| 2008/0275625 A1 | 11/2008 | Snyder | |
| 2008/0318728 A1 | 12/2008 | Soliman et al. | |
| 2009/0075779 A1 | 3/2009 | Kumazaki et al. | |
| 2009/0076694 A1 | 3/2009 | Tabata et al. | |
| 2009/0145673 A1 | 6/2009 | Soliman et al. | |
| 2010/0063660 A1 | 3/2010 | Uchida | |
| 2010/0099532 A1 | 4/2010 | Cashen | |
| 2012/0028757 A1 | 2/2012 | Kimura et al. | |
| 2012/0197475 A1* | 8/2012 | Akutsu | B60K 6/26 701/22 |
| 2012/0244992 A1 | 9/2012 | Hisada et al. | |
| 2012/0245774 A1 | 9/2012 | Takami et al. | |
| 2013/0102429 A1 | 4/2013 | Kaltenbach et al. | |
| 2013/0109530 A1 | 5/2013 | Kaltenbach et al. | |
| 2013/0316865 A1 | 11/2013 | Engström et al. | |
| 2014/0024490 A1* | 1/2014 | Bangura | F16H 37/065 477/3 |
| 2014/0051537 A1 | 2/2014 | Liu et al. | |
| 2014/0243149 A1* | 8/2014 | Holmes | B60W 20/40 477/5 |
| 2015/0046009 A1 | 2/2015 | Maruyama et al. | |
| 2015/0051773 A1 | 2/2015 | Hayashi et al. | |
| 2015/0149012 A1 | 5/2015 | Pettersson et al. | |
| 2015/0239459 A1* | 8/2015 | Pettersson | B60K 6/365 477/3 |
| 2015/0375734 A1* | 12/2015 | Pettersson | B60K 6/365 701/22 |
| 2016/0052381 A1 | 2/2016 | Kaltenbach et al. | |
| 2016/0159344 A1 | 6/2016 | Hata et al. | |
| 2016/0176396 A1 | 6/2016 | Hata et al. | |
| 2016/0288784 A1 | 10/2016 | Teraya et al. | |
| 2017/0001622 A1 | 1/2017 | Lindstrom et al. | |
| 2017/0001634 A1 | 1/2017 | Lindstrom et al. | |
| 2017/0043763 A1 | 2/2017 | Ketfi-Cherif et al. | |
| 2017/0144649 A1* | 5/2017 | Bangura | B60W 20/13 |
| 2017/0282702 A1 | 10/2017 | Kim | |

(56) References Cited

U.S. PATENT DOCUMENTS

FOREIGN PATENT DOCUMENTS

| | | |
|---|---|---|
| DE | 19838853 A1 | 3/1999 |
| DE | 19841829 A1 | 3/2000 |
| DE | 102006028602 A1 | 12/2007 |
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 102009000970 A1 | 8/2010 |
| DE | 102011084930 A1 | 4/2013 |
| DE | 112011104811 T5 | 10/2013 |
| DE | 19838853 B4 | 11/2013 |
| EP | 552140 A1 | 10/1995 |
| EP | 552140 B1 | 10/1995 |
| EP | 1136311 A2 | 9/2001 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| FR | 2832356 A1 | 5/2003 |
| JP | 07135701 A | 5/1995 |
| JP | 11332018 A | 11/1999 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 0006407 A1 | 2/2000 |
| WO | 2007113438 A1 | 10/2007 |
| WO | 2008016357 A2 | 2/2008 |
| WO | 2011070390 A1 | 6/2011 |
| WO | 2012091659 A1 | 7/2012 |
| WO | 2013002707 A1 | 1/2013 |
| WO | 2013140546 A1 | 9/2013 |
| WO | 2013145089 A1 | 10/2013 |
| WO | 2013145101 A1 | 10/2013 |

OTHER PUBLICATIONS

International Search Report for PCT/SE2014/051568 dated Apr. 29, 2015.
Scania CV AB, European Patent Application No. 14874674.6, Extended European Search Report, dated Sep. 20, 2017.
Scania CV AB, European Patent Application No. 14874674.6, Office Action, dated Jan. 25, 2019.
Scania CV AB, International Application No. PCT/SE2014/051568, International Preliminary Report on Patentability, dated Jun. 28, 2016.

* cited by examiner

METHOD OF STARTING A VEHICLE WITH POWER BALANCE

CROSS-REFERENCE TO RELATED APPLICATIONS

This application is a national stage application (filed under 35 § U.S.C. 371) of PCT/SE2014/051568, filed Dec. 23, 2014 of the same title, which, in turn, claims priority to Swedish Application No. 1351574-7, filed Dec. 23, 2013; the contents of each of which are hereby incorporated by reference

Field of the Invention

The present invention relates to a method for the control of a vehicle, and particularly, but not exclusively, focused on the performance of such a method in motor vehicles in the form of wheeled commercial vehicles, especially heavy goods vehicles, such as trucks and buses. The invention thus relates to a method carried out in a hybrid vehicle, which, generally, is a vehicle that may be powered by a primary engine, e.g. a combustion engine, and a secondary engine, such as at least one electrical machine. The vehicle is suitably, but for the purposes of the present invention not necessarily, equipped with means for storage of electric energy, such as a battery or a capacitor for storage of electric energy, and control equipment to control the flow of electric energy between the means and the electrical machine. The electrical machine(s) may in such a case alternately operate as an engine or as a generator, depending on the vehicle's operating mode. When the vehicle decelerates, the electrical machine generates energy that may be stored, and the stored electric energy is used later for e.g. operation of the vehicle.

BACKGROUND OF THE INVENTION

Using a conventional clutch mechanism, which disconnects the gearbox's input shaft from the combustion engine during a shifting process in the gearbox, entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and the disadvantages associated therewith may be avoided. A vehicle with a drive system of this type constitutes prior art, as set out in EP 1 319 546 and SE 536 329.

Certainly, a range of advantageous methods to control a vehicle with a drive system of the type described in SE 536 329 constitute prior art, however there is naturally a constant endeavor to improve the manner of controlling such vehicles, especially in certain specific operating situations.

SUMMARY OF THE INVENTION

The objective of the present invention is to show a method of the type defined above, which is in line with the above-mentioned endeavor.

Having a drive system in a vehicle with a second electrical machine opens up a possibility for an improved behavior in a range of operational situations compared to prior art drive systems lacking such an electrical machine. Such an operational situation arises where a vehicle is started from a standstill with the combustion engine running, with the first locking means in a release position, and the combustion engine's output shaft connected with the second electrical machine's rotor. The vehicle may then be driven with electric power balance, since the first electrical machine is controlled to achieve a torque thereof, so that the requested torque is transferred to the planetary gear's output shaft, the combustion engine is controlled towards and to a predetermined engine speed, for example its idling engine speed, the second electrical machine is controlled to achieve a torque, in order to achieve the desired electric power to electrical auxiliary units, and/or loads in the vehicle and/or the first electrical machine, and/or electric energy storage means, if existing in the vehicle, for exchange of electric power with the first and the second electrical machine, and the first locking means is moved to a locked position, when the planetary gear's output shaft, the first electrical machine's rotor and the combustion engine's output shaft rotate with at least substantially the same rotational speed. The predetermined engine speed of the combustion engine is determined either by selecting the idling engine speed or according to prevailing circumstances, such as the vehicle's weight. As long as none of the combustion engine, the first electrical machine and the second electrical machine achieve their performance limits, both the desired torque and the desired electrical power may be achieved at such start of driving. If the torque available from the combustion engine is insufficient, the engine speed may be increased or the power target may be abandoned. If the second electrical machine reaches its limit, the power target must be abandoned. Abandoning the power target entails that the electrical energy storage means, if installed, must deliver a current to the first electrical machine and electrical loads. This is usually possible, although not desirable. Initially at the start, the rotor rotates backwards in the first electrical machine, and generates power when a positive torque must be achieved. In some cases it may be difficult to receive the power generated where there is no battery and, where there is a battery, e.g. at low temperatures of the battery, but in such case this power may be directly consumed by the second electrical machine, by the latter delivering a torque which helps the combustion engine's output shaft to rotate.

According to one embodiment of the invention, in step b) the engine speed of the combustion engine is controlled, in the event the torque available at selection of idling speed is insufficient to counteract both the reaction torque from the first electrical machine and the torque applied from the second electrical machine, in order to increase the engine speed of the combustion engine so that the torque available from the combustion engine increases, with the objective of achieving both the desired torque and the desired electric power. Such control of the combustion engine is carried out either directly at the beginning of the method or during its course. Accordingly, an increase of the engine speed of the combustion engine entails that the available torque also increases. When the engine speed increases, the torque that the combustion engine must produce to achieve power balance also drops.

According to another embodiment of the invention. a vehicle is controlled, which has a drive system that also comprises a second locking means that may be moved between a locked position, in which the combustion engine's output shaft is locked together with the second electrical machine's rotor and said first component, and a release position in which the combustion engine's output shaft is disconnected from the second electrical machine's rotor and said first component, and is allowed to rotate independently of these, and in which vehicle the second locking means is in a locked position at the start of the method. Through the presence of such second locking means, the combustion engine may be decoupled and the vehicle may be driven purely electrically when desired, but it also within the scope of the invention for the combustion engine's output shaft to be directly, permanently connected with the planetary gear's input shaft.

According to another embodiment of the invention, said power balance is achieved in step c), so that within the limitations generally specified for the drive system, free selection of charge current to or discharge current from said electric auxiliary units and/or loads and/or electric energy storage means, if applicable, occurs in accordance with the prevailing operational situation in the vehicle. The term power balance means that it is possible, within the general limitations specified for the drive system, to freely choose the charge current to, or the discharge current from the energy storage means, if applicable, and/or electric auxiliary units and/or loads in the vehicle at existing operating modes.

According to another embodiment of the invention, a vehicle is controlled, which has at least one electric energy storage means, arranged for exchange of electric power between the latter, and the first and second electrical machine.

"Electrical energy storage means" as used in this document means an energy storage means with an electrical interface in relation to the first and second electrical machine of the drive system, but storage of energy does not have to be electrical. This entails that in addition to an electrical battery and capacitor, for example flywheels, other mechanical means and means for building up pressure, e.g. pneumatic or hydraulic means, may be considered.

According to another embodiment of the invention, where needed, the maintenance of power balance is temporarily waived while step c) is implemented. This may be because the combustion engine is not able to build up torque quickly enough to meet the power requirement or because the latter is greater than what the combustion engine is able to provide. The abandonment of the objective of maintaining power balance entails that the electric energy storage means must deliver a current to the first electrical machine, and/or the electric auxiliary unit and/or loads in the vehicle, which is usually possible, if not desirable.

According to another embodiment of the invention, the method is implemented in a vehicle with a said drive system, wherein the planetary gear's sun wheel is said first component, and the ring gear is said third component. By connecting the first electrical machine's rotor with the ring gear and the combustion engine's output shaft with the sun wheel, a compact construction is achieved, which is easy to fit into already existing spaces for powertrains (drive systems) with clutch mechanisms instead of planetary gears.

According to another embodiment of the invention the method is implemented in a vehicle with a gearbox having an input shaft, which is connected with said second output shaft in the planetary gear.

The invention also relates to a computer program product and an electronic control device.

Other advantageous features and advantages with the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
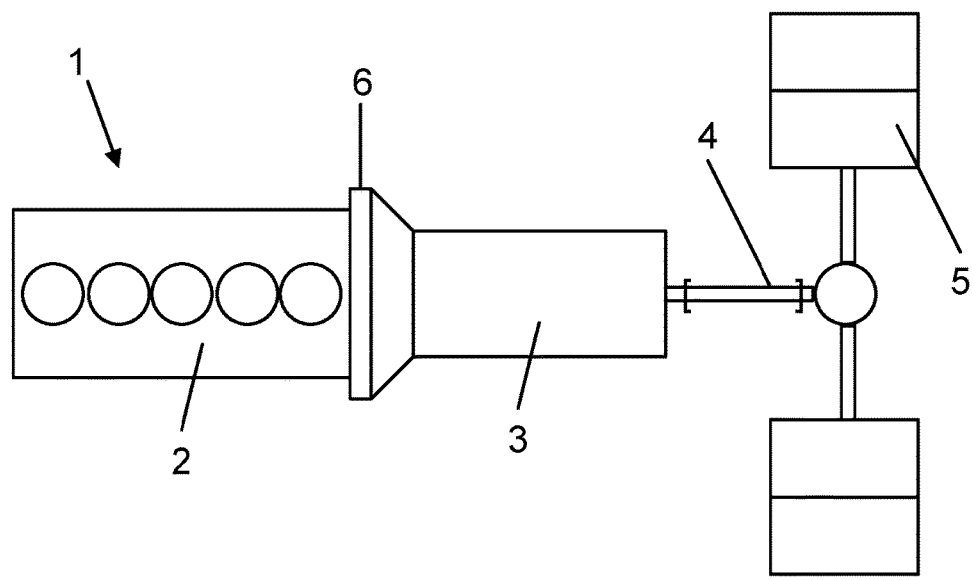
FIG. 1 is a very simplified view of a powertrain in a vehicle that may be equipped with a drive system for the performance of a method according to the invention.
Figure 2:
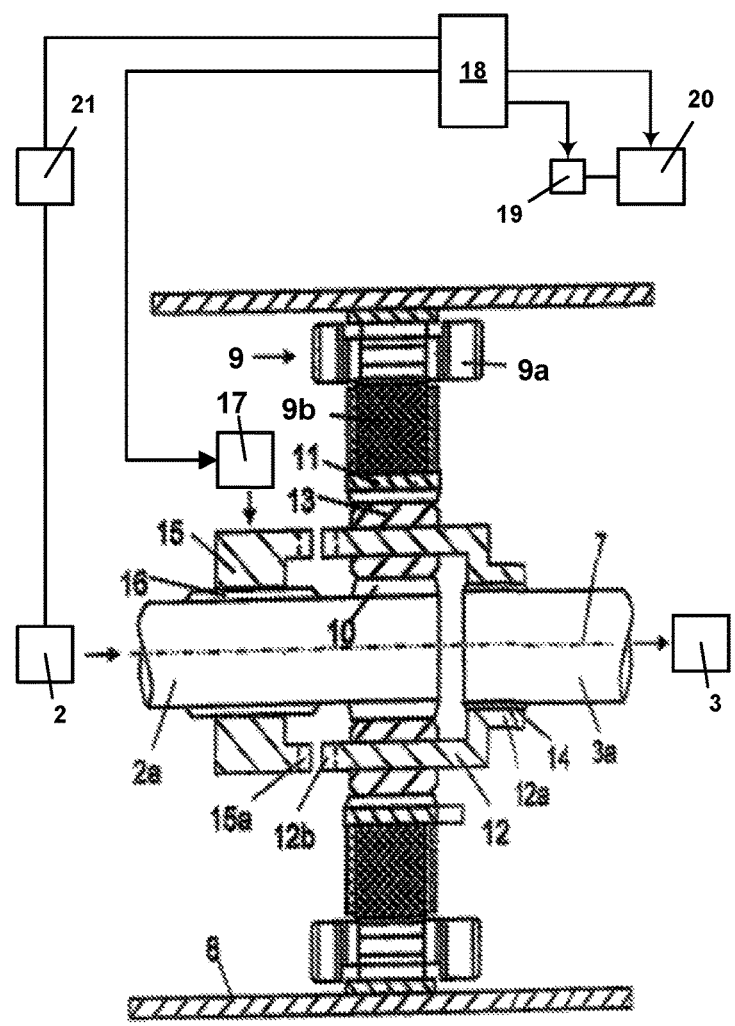
FIG. 2 is a more detailed, but still simplified view of a part of said drive system.

FIG. 1 shows a powertrain for a heavy goods vehicle 1. The powertrain comprises a combustion engine 2, a power transmission 3 in the form of for example a speed gearbox, a continuously variable transmission (CVT), or a direct transmission, a number of driving shafts 4 and driving wheels 5. Between the combustion engine 2 and the gearbox 3 the powertrain comprises an intermediate section 6. FIG. 2 shows a part of the components in the intermediate section 6 in more detail, more specifically those which also occur in prior art drive systems, such as the one according to SE 536 329. The combustion engine 2 is equipped with an output shaft 2a and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator-core which is fixed in a suitable manner on the inside of the house 8. The stator core comprises the stator's windings. The first electrical machine 9 is adapted, under certain operating circumstances, to use stored electrical energy to supply driving force to the input shaft 3a of the gearbox and under other operating conditions, to use the kinetic energy of the input shaft 3 of the gearbox to extract and store electric energy.

The planetary gear is arranged substantially radially inside of the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13, which are rotatably arranged in a radial space between the teeth of the sun wheel 10 and the ring gear 11. The sun wheel 10 is fixed on a peripheral surface of the combustion engine's output shaft 2a. The sun wheel 10 and the combustion engine's output shaft 2a rotate as one unit with a first rotational speed $n_1$. The planetary wheel carrier 12 comprises an attachment section 12a, which is attached on a peripheral surface of the input shaft $3a$ of the gearbox with the help of a splines-joint 14. With the help of this joint, the planetary wheel carrier 12 and the gearbox's input shaft $3a$ may rotate as one unit with a second rotational speed $n_2$. The ring gear 11 comprises an external peripheral surface on which the rotor $9b$ is fixedly mounted. The rotor $9b$ and the ring gear 11 constitute one rotatable unit which rotates at a third rotational speed $n_3$.

The drive system comprises a first locking means since the combustion engine's output shaft $2a$ is equipped with a shiftable coupling element 15. The coupling element 15 is mounted on the combustion engine's output shaft $2a$ with the help of a splines-joint 16. The coupling element 15 is in this case arranged in a twist-fast manner on the combustion engine's output shaft $2a$, and is shiftably arranged in an axial direction on the combustion engine's output shaft $2a$. The coupling element 15 comprises a coupling section $15a$, which is connectible with a coupling section $12b$ in the planetary wheel carrier 12. A schematically displayed shifting element 17 is adapted to shift the coupling element 15 between a first position where the coupling sections $15a$, $12b$ are not in engagement with each other, corresponding to a release position in the first locking means, and a second position where the coupling sections $15a$, $12b$ are in engagement with each other, corresponding to a locked position of the first locking means. In such locked position the combustion engine's output shaft $2a$ and the gearbox's input shaft $3a$ will be locked together and accordingly these and the electrical machine's rotor will rotate at the same rotational speed. This state may be referred to as a locked planet. The locking mechanism may also advantageously have the design described in the Swedish patent application SE 536 559, and comprise a sleeve equipped with first splines, which engage, in the release position, with second splines on a first component of the planetary gear, and in the locked position, engage with third splines on a second component of the planetary gear. In this case the first component is preferably the planetary wheel carrier, and the second component is the sun wheel. The locking mechanism may then be adapted like an annular sleeve, enclosing the planetary wheel carrier substantially concentrically. The locking means may also be made of a suitable type of friction clutch.

An electronic control device 18 is adapted to control the shifting element 17. The control device 18 is also adapted to determine the occasions on which the electrical machine should operate as an engine, and the occasions on which it should operate as a generator. In order to so determine, the control device 18 may receive up to date information relating to suitable operating parameters. The control device 18 may be a computer with software for this purpose. The control device 18 controls a schematically displayed control equipment 19, which controls the flow of electric energy between a hybrid battery 20 and the stator windings $9a$ of the electrical machine. On occasions where the electrical machine 9 operates as an engine, stored electric energy is supplied from the hybrid battery 20 to the stator $9a$. On occasions where the electrical machine operates as a generator electric energy is supplied from the stator $9a$ to the hybrid battery 20. The hybrid battery 20 delivers and stores electric energy with a voltage in the range of 300-900 Volt. Since the intermediate section 6 between the combustion engine 2 and the gearbox 3 in the vehicle is limited, the electrical machine 9 and the planetary gear must constitute a compact unit. The planetary gear's components 10, 11, 12 are arranged substantially radially inside the electrical machine's stator $9a$. The rotor $9b$ of the electrical machine, the ring gear 11 of the planetary gear, the combustion engine's output shaft $2a$ and the input shaft $3a$ of the gearbox are here rotatably arranged around a common rotation axis 5. With such an embodiment the electrical machine 9 and the planetary gear occupy a relatively small area. The vehicle 1 is equipped with an engine control function 21, with which the engine speed $n_1$ and/or torque of the combustion engine 2 may be controlled. The control device 18 accordingly has the possibility of activating the engine control function 21 and of creating a substantially zero torque state in the gearbox 3 at engagement and disengagement of gears in the gearbox 3. Naturally, the drive system may, instead of being controlled by one single control device 18, be controlled by several different control devices.

The part of a drive system of a vehicle, thus far described, and displayed at FIG. 2, on which a method according to the invention may be implemented is extant in the drive system according to SE536 329. Below, a part of the drive system, which may be added to this part for the implementation of the invention, will be described with reference to FIG. 3.

The drive system, specifically the intermediate section 6, also has a second electrical machine 30 with a stator 31, with stator windings and a rotor 32 which is connected with the combustion engine's output shaft $2a$. A second locking means 33, which may have a similar design as the first locking means 34, illustrated in more detail in FIG. 2, is adapted to separate, in a release position, a first part 35 of the combustion engine's output shaft, arranged nearest the combustion engine, from a second part 36 thereof, connected with the sun wheel 10 of the planetary gear, so that the second electrical machine's rotor 32 and the sun wheel 10 are allowed to rotate independently of the first section 35 of the combustion engine's output shaft. The second locking means may be moved to a locked position in which both the parts 35, 36 of the combustion engine's output shaft are locked together, and accordingly the first part 35 is locked together with the second electrical machine's rotor. The control device 18 is adapted to control fuel supply to the combustion engine 2 and to control exchange of electric energy between, the first electrical machine 9 and the second electrical machine 30 on the one hand, and, on the other hand, electric energy storage means, if applicable, such as batteries, and electric auxiliary units and loads in the vehicle, such as servo control units, pumps, cooling units and similar.

Thanks to the added arrangement of the electrical machine 30 and the second locking means 33, a range of positive features is achieved in the drive system, but it should be pointed out again that the occurrence of the second locking means in the drive system is not necessary to realize the method according to the invention, but the combustion engine's output shaft could be permanently connected with the second electrical machine's rotor. If the vehicle is driven with the first locking means 34 in a locked position, and for example the second locking means 33 in a locked position, and a request arises for shifting the first locking means 34 into a release position, the power unit configuration is controlled towards a torque balance between the components that are locked together, i.e. the planetary wheel carrier 12 and the sun wheel 10, via the first locking means 34. This may be achieved by controlling the first electrical machine 9, and at least one of the second electrical machine 30 and the combustion engine 2, since the second locking means 33 is in a locked position, and the first electrical machine 9 and/or the second electrical machine 30, towards said torque balance, so that there is also a possibility for energy storage in the hybrid battery 30 if desired. Here, torque balance is achieved when the following relation between the torques applied is met for the example configuration displayed in FIG. 3:

$$T_{sun\ wheel} = \frac{Z_s}{Z_r} T_{ring\ gear}$$

where $T_{sun\ wheel}$ and $T_{ring\ gear}$ represent the torque applied to the sun wheel and the ring gear, respectively, where $T_{sun\ wheel} = T_{ice} + T_{em2}$ and $T_{ring\ gear} = T_{em1}$ where $T_{ice}$ is torque applied to the combustion engine's output shaft
$T_{em2}$ is torque applied via the second electrical machine's stator to its rotor
$T_{em1}$ is torque applied via the first electrical machine's stator to its rotor,
$Z_s$ is the number of teeth on the sun wheel,
$Z_r$ is the number of teeth on the ring gear.

Accordingly, torque balance relates to the state where a torque acts on a ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1 minus the planetary gear's gear ratio). At such torque balance said first locking means 34 does not transfer any torque between the components of the planetary gear. The inventive method facilitates starting the vehicle from a standstill, while maintaining the above defined power balance in the vehicle's drive system.

Figure 3:
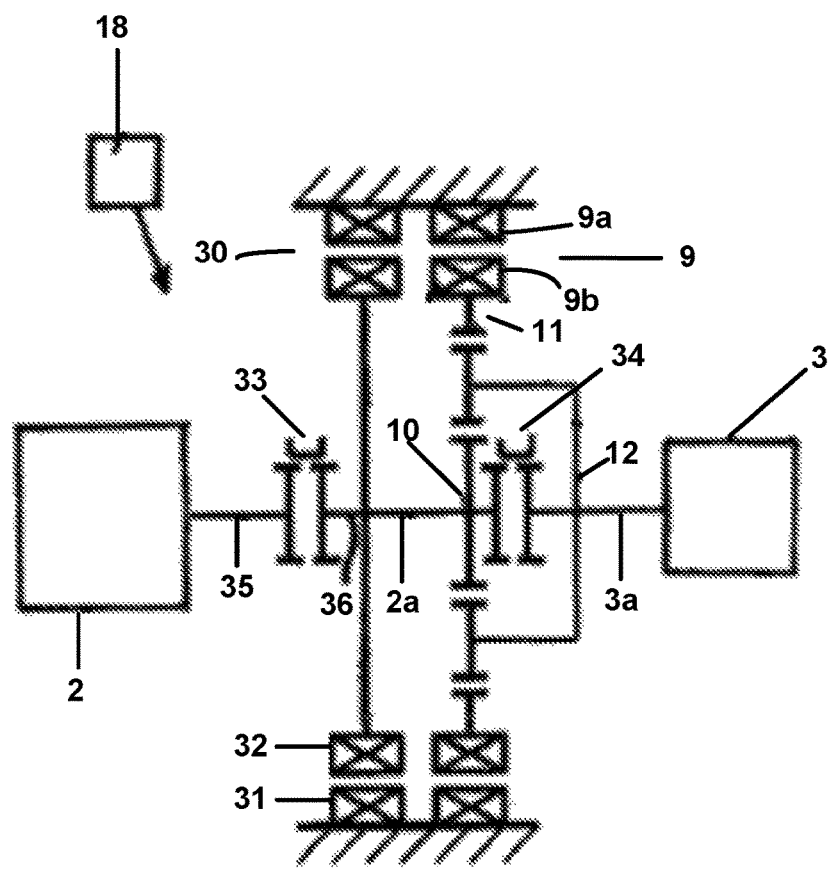
FIG. 3 is a simplified view, illustrating the general structure of a drive system in a vehicle, for which a method according to one embodiment of the invention is carried out.

A great advantage of a drive system according to FIG. 3, with or without the second locking means, is the potential for continuous electric power supply by the electric units in all operating modes, with the combustion engine connected in a steady state. This is normally not achieved with hybrid solutions having only one electrical machine. When the first locking means is in a locked position, said electric unit is supplied by substantially distributing the requested electrical power to the electric auxiliary aggregates and the electric loads of the vehicle between the electrical machines. In this way, the losses in the electrical machines are minimized, since the torque per electrical machine is halved compared to if an electrical machine had supplied all the electrical output. Since the loss effects of the electrical machines substantially scale against the torque applied squared, this entails substantially a halving of the losses of the electrical machines. However, such a distribution (50/50) is potentially not optimal in case the two electrical machines have dimensions which differ considerably from each other, but efforts are still made to select said proportions with this optimal distribution in mind. When the first locking means is open, the first electrical machine will determine the torque in the powertrain. The engine speed of the combustion engine is controlled to an operational point, which is selected by minimizing the losses of the combustion engine together with losses of the electrical machine and the inverter. The second electrical machine is then used to balance the power for potential energy storage means, electrical aggregates and the first electrical machine. It is a great strength that the power supply of the electrical aggregates may also take place, even if the vehicle is not equipped with an electrical energy storage system. The supply may also take place continuously during all types of up- and down-shifts, during crawling, start-off and braking. All driving modes, except electrical driving and brake regeneration, may be implemented without any electrical storage means or with a defective energy storage means. In operating modes, with or without electrical energy storage means, the voltage of the second electrical machine normally will be controlled to maintain the correct voltage level on the DC-link (supply voltage to the two inverters connected to the stators of the electrical machines). It is also conceivable that the voltage of the first electrical machine may be controlled in some cases. Voltage control is a "mode" of the inverter where a voltage is requested from the inverter. The inverter then controls the electrical machine's torque in such a way that the requested voltage is maintained on the inverter's supply side.

Figure 4:
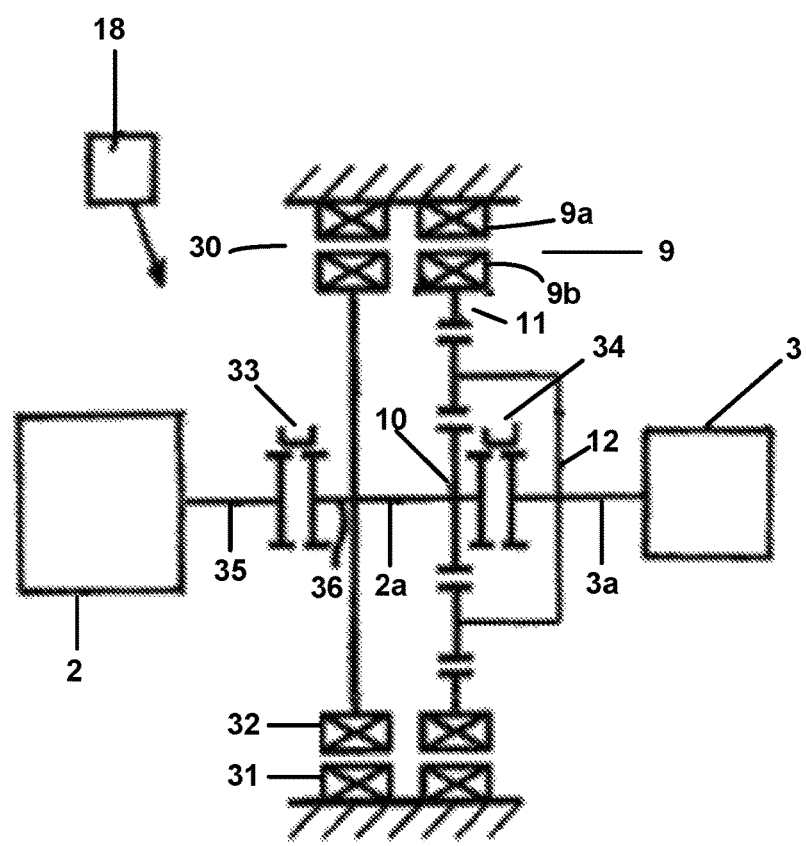
FIG. 4 is a simplified view, illustrating the general structure of another drive system in a vehicle, for which a method according to one embodiment of the invention is carried out.

FIG. 4 shows, in a simplified way, a drive system which differs from the one according to FIG. 3, since the combustion engine 2 is permanently connected with the second electrical machine's rotor 32. Embodiments of the innovative method may be carried out in vehicles with this alternative drive system.

Figure 5:
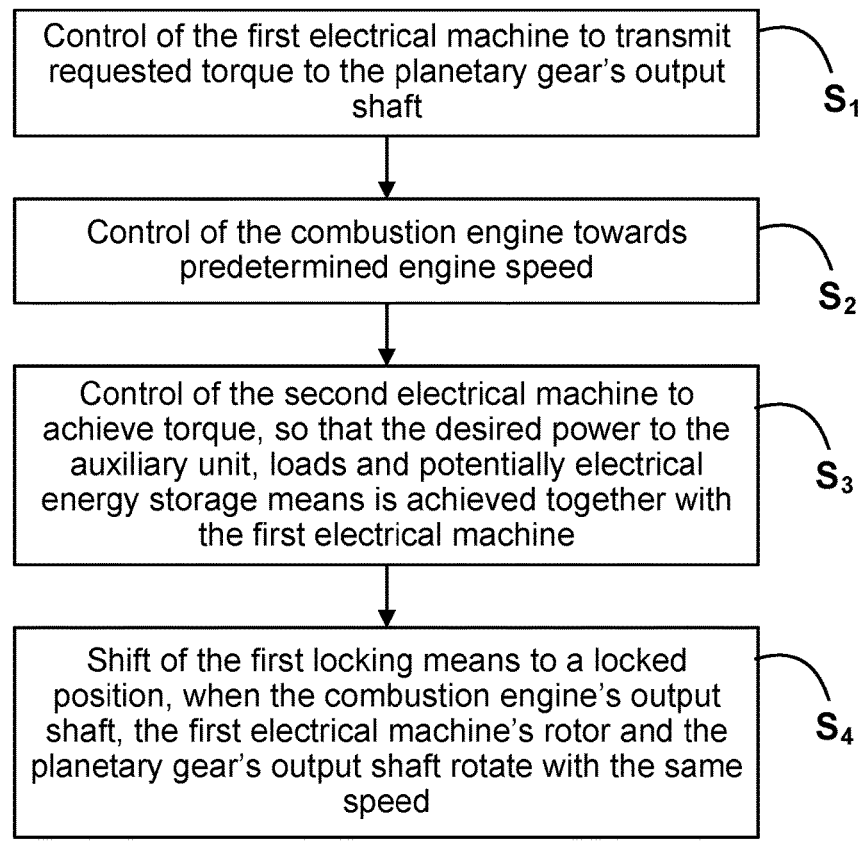
FIG. 5 is a flow chart showing a method according to one embodiment of the invention.

FIG. 5 illustrates a flow chart of a method according to one embodiment of the present invention, implemented in a vehicle with a drive system of the type displayed in FIG. 3 or 4. It is assumed that the vehicle is at a standstill, and will be started and driven with the goal of maintaining said power balance. In a first step $S_1$, the first electrical machine is then controlled to transmit the requested torque to the planetary gear's output shaft. At the same time, the combustion engine is controlled towards a predetermined engine speed, which may be its idling speed or a higher engine speed (see above), in a step S2. In step S3 the electrical machine is controlled to achieve a torque entailing that a desired power to the auxiliary unit and loads, and potentially electric energy storage means, is achieved together with the first electrical machine, and in step S4 the first locking means are moved into a locked position, when the combustion engine's output shaft, the first electrical machine's rotor and the planetary gear's output shaft rotate with the same rotational speed. It should be pointed out that when the method is performed, it is not a requirement that the vehicle be moved off, but instead the vehicle may be started, creep forward, and then be stopped.

Computer program code for implementation of a method according to the invention is suitably included in a computer program, which is loadable into the internal memory of a computer, such as the internal memory of an electronic control device of a vehicle. Such a computer program is suitably provided via a computer program product, comprising a data storage medium readable by an electronic control device, which data storage medium has the computer program stored thereon. Said data storage medium is e.g. an optical data storage medium in the form of a CD-ROM, a DVD, etc., a magnetic data storage medium in the form of a hard disk drive, a diskette, a cassette, etc., or a Flash memory or a ROM, PROM, EPROM or EEPROM type memory.

Figure 6:
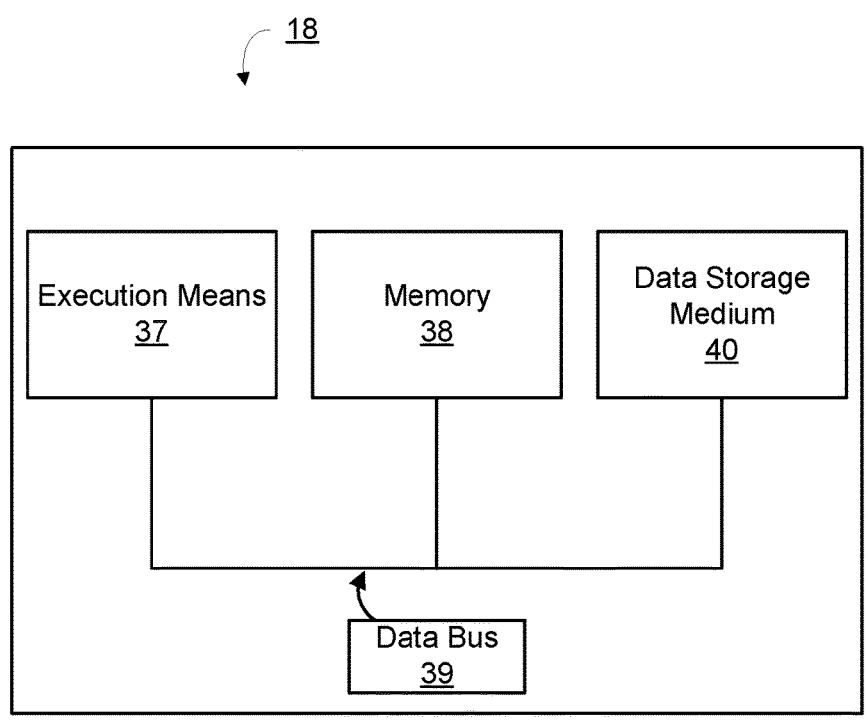
FIG. 6 is a fundamental diagram of an electronic control device for implementation of one or several methods according to the invention.

FIG. 6 very schematically illustrates an electronic control device 18 comprising execution means 37, such as a central processor unit (CPU), for the execution of computer software. The execution means 37 communicates with a memory 38, e.g. a RAM memory, via a data bus 39. The control device 18 also comprises a durable data storage medium 40, e.g. in the form of a Flash memory or a ROM, PROM, EPROM or EEPROM type memory. The execution means 37 communicates with the data storage means 40 via the data bus 39. A computer program comprising computer program code for the implementation of a method according to the invention is stored on the data storage medium 40.

The invention is obviously not limited in any way to the embodiments described above, but numerous possible modifications thereof should be obvious to a person skilled in the area, without such person departing from the spirit of the invention as defined by the appended claims.

For example, it is not necessary that the drive system has such an electric power storage means.

The inventive method could be carried out in a vehicle with a drive system, which has the planetary gear's ring gear as said first component and the sun wheel as said third component, which means that the first electrical machine's rotor would be connected with the planetary sun wheel and the second electrical machine's rotor and the combustion engine would be connected with the planetary gear's ring gear instead of with the sun wheel. Advantageously, however, the planetary gear's output shaft for transmission of torque for the vehicle's propulsion is connected with the planetary wheel carrier.

Nor is it necessary for the output shaft from the planetary gear to be an input shaft in a gearbox, instead the vehicle could have no gearbox.

The invention claimed is:

1. A method for control of a vehicle with a drive system, where the drive system comprises an output shaft in a combustion engine; a first electrical machine, comprising a stator and a rotor; a planetary gear comprising three components in the form of a sun wheel, a ring gear and a planetary wheel carrier, wherein the combustion engine's output shaft is connected with a first of said components in the planetary gear, so that a rotation of such shaft leads to a rotation of such first of said components, wherein an output shaft of the planetary gear is connected with a second of said components in the planetary gear, so that a rotation of such shaft leads to a rotation of such second of said components, and the electrical machine's rotor is connected with a third of said components in the planetary gear, for transmission of torque for the propulsion of the vehicle, so that a rotation of the rotor leads to a rotation of such third of said components; wherein the drive system also comprises a first locking means, which may be moved between a locked position in which two of said components are locked together so that the three components rotate with the same rotational speed, and a release position in which the components are allowed to rotate at different rotational speeds; and second electrical machine with a stator and a rotor, connected with the output shaft of the combustion engine, between the combustion engine and said first of said components, and wherein the method comprises the following operations in order to, when the vehicle is at a standstill with the first locking means in a release position, move the vehicle off with power balance:
  a) controlling the first electrical machine to achieve a torque, so that the torque from the first electrical machine is transmitted to the output shaft of the planetary gear;
  b) controlling the combustion engine towards and to a predetermined engine speed;
  c) controlling the second electrical machine to achieve a torque, so that a desired power is generated by the second electrical machine, whereby the power may be provided to the first electrical machine and/or other electrical devic or load; and
  d) moving the first locking means to a locked position, when the output shaft of the planetary gear, the first electrical machine's rotor, and the combustion engine's output shaft rotate with the same rotational speed.

2. The method according to claim 1, wherein, while controlling the combustion engine towards and to a predetermined engine speed, said method further comprises controlling the engine speed of the combustion engine, in the event the torque available at idling speed is insufficient to counteract both a reaction torque from the first electrical machine and a torque applied from the second electrical machine, in order to increase the engine speed of the combustion engine, so that a torque available from the combustion engine increases.

3. The method according to claim 1, wherein the drive system of the vehicle also comprises a second locking means that may be moved between a locked position, in which the combustion engine's output shaft is locked together with the second electrical machine's rotor and said first of said components, and a release position, in which the combustion engine's output shaft is disconnected from the second electrical machine's rotor and said first of said components, and is allowed to rotate independently of these, and wherein the second locking means is in a locked position at the start of the method.

4. The method according to claim 1, wherein while controlling the second electrical machine to achieve a torque for exchange of electric power with the first and second electrical machine, power balance is achieved, said method further comprises a free selection of charge current to or discharge current from one or more of an electrical auxiliary unit, electrical load, and/or an electrical energy storage means occurs in accordance with a prevailing operational situation of the vehicle.

5. The method according to claim 1, wherein the drive system further comprises at least one electric energy storage means, and said method further comprises exchanging of electric power between the electric energy storage means and at least one of the first and the second electrical machine.

6. The method according to claim 5, wherein maintaining a power balance is temporarily waived where needed, when controlling the second electrical machine to achieve a torque for exchange of electric power with the first and second electrical machine.

7. The method according to claim 1, wherein the method is implemented in the vehicle, wherein the vehicle further comprises a gearbox with an input shaft, which is connected with said output shaft of the planetary gear.

8. The method according to claim 1, wherein the first of said components of said planetary gear is a sun wheel and the third of said components is a ring gear.

9. A computer program product for moving a vehicle off with power balance when the vehicle is at a standstill with a first locking means in a release position, wherein the vehicle comprises a drive system comprising an output shaft in a combustion engine, a first electrical machine, comprising a stator and a rotor, a planetary gear comprising three components in the form of a sun wheel, a ring gear and a planetary wheel carrier, wherein the combustion engine's output shaft is connected with a first of said components in the planetary gear, so that a rotation of such shaft leads to a rotation of such first of said components, wherein an output shaft of the planetary gear is connected with a second of said components in the planetary, gear so that a rotation of such shaft leads to a rotation of such second of said components, and the electrical machine's rotor is connected with a third of said components in the planetary gear, for transmission of torque for the propulsion of the vehicle, so that a rotation of the rotor leads to a rotation of such third of said components, wherein the drive system also comprises the first locking means, which may be moved between a locked position in which two of said components are locked together so that the three components rotate with the same rotational speed, and a release position in which the components are allowed to rotate at different rotational speeds, wherein a vehicle is controlled, whose drive system also comprises a second electrical machine with a stator and a rotor, connected with the output shaft of the combustion engine, between the combustion engine and said first of said components, wherein the computer program product is stored in a non-transitory computer-readable medium and comprises computer-readable program code portions embodied therein, the computer-readable program code portions comprises computer code to cause an electronic processor to:
  a) control the first electrical machine to achieve a torque, so that the torque from the first electrical machine is transmitted to the output shaft of the planetary gear;
  b) control the combustion engine towards and to a predetermined engine speed;
  c) control the second electrical machine to achieve a torque, so that a desired power is generated by the second electrical machine, whereby the power may be provided to the first electrical machine and/or other electrical device or load; and
  d) control movement of the first locking means to a locked position, when the output shaft of the planetary gear, the first electrical machine's rotor, and the combustion engine's output shaft rotate with the same rotational speed.

10. An electronic control device for a motor vehicle for moving a vehicle off with power balance when the vehicle is at a standstill with a first locking means in a release position,
  wherein the vehicle comprises a drive system comprising an output shaft in a combustion engine; a first electrical machine, comprising a stator and a rotor; a planetary gear comprising three components in the form of a sun wheel, a ring gear and a planetary wheel carrier, wherein the combustion engine's output shaft is connected with a first of said components in the planetary gear, so that a rotation of such shaft leads to a rotation of such first of said components, wherein an output shaft of the planetary gear is connected with a second of said components in the planetary, gear so that a rotation of such shaft leads to a rotation of such second of said components, and the electrical machine's rotor is connected with a third of said components in the planetary gear, for transmission of torque for the propulsion of the vehicle, so that a rotation of the rotor leads to a rotation of such third of said components; wherein the drive system also comprises the first locking means, which may be moved between a locked position in which two of said components are locked together so that the three components rotate with the same rotational speed, and a release position in which the components are allowed to rotate at different rotational speeds; and a second electrical machine with a stator and a rotor, connected with the output shaft of the combustion engine, between the combustion engine and said first of said components,
wherein said electronic device comprises:
a storage device;
an electronic processor operatively coupled to the storage device; and
a computer program product stored in a non-transitory computer-readable medium on the storage device and comprising computer-readable program code portions embodied therein, the computer-readable program code portions comprises computer code to cause an electronic processor to:
  a) control the first electrical machine to achieve a torque, so that the torque from the first electrical machine is transmitted to the output shaft of the planetary gear;
  b) control the combustion engine towards and to a predetermined engine speed;
  c) control the second electrical machine to achieve a torque, so that a desired power is generated by the second electrical machine, whereby the power may be provided to the first electrical machine and/or other electrical device or load; and
  d) control movement of the first locking means to a locked position, when the output shaft of the planetary gear, the first electrical machine's rotor, and the combustion engine's output shaft rotate with the same rotational speed.

* * * * *

UNITED STATES PATENT AND TRADEMARK OFFICE
CERTIFICATE OF CORRECTION

PATENT NO. : 10,618,509 B2
APPLICATION NO. : 15/106815
DATED : April 14, 2020
INVENTOR(S) : Johan Lindström et al.

Page 1 of 1

It is certified that error appears in the above-identified patent and that said Letters Patent is hereby corrected as shown below:

In the Claims

In Column 9, Claim 1, please change Line 47 to:
rotate at different rotational speeds; and a second electrical In Column 9, Claim 1, please change Line 65 to:
other electrical device or load; and Signed and Sealed this
Twenty-ninth Day of September, 2020

Andrei Iancu
*Director of the United States Patent and Trademark Office*